US005688004A

United States Patent [19]
Karge

[11] Patent Number: 5,688,004
[45] Date of Patent: Nov. 18, 1997

[54] MOTOR VEHICLE DOOR LOCK ARRANGEMENT FOR A DOUBLE REAR HATCH

[75] Inventor: Siegfried Karge, Wuppertal, Germany

[73] Assignee: Robert Bosch GmbH, Stuttgart, Germany

[21] Appl. No.: 583,982

[22] Filed: Jan. 11, 1996

[30] Foreign Application Priority Data

Jan. 6, 1995 [DE] Germany ........................ 195 00 284.9

[51] Int. Cl.$^{6}$ ........................ C05B 15/02

[52] U.S. Cl. ........................ 292/341.17; 292/48; 292/201

[58] Field of Search ........................ 292/341.17, 52, 292/48, 201, DIG. 23, DIG. 43, DIG. 29, 341.16

[56] References Cited

U.S. PATENT DOCUMENTS

| | | | |
|---|---|---|---|
| 1,414,862 | 5/1922 | Colavita . | |
| 2,263,065 | 11/1941 | Baidauf . | |
| 2,929,657 | 3/1960 | Deveraux . | |
| 3,645,043 | 2/1972 | Velavicius et al. | 49/370 |
| 4,143,904 | 3/1979 | Cooper et al. | 292/DIG. 29 X |
| 4,157,844 | 6/1979 | Sarosy et al. | 292/48 |
| 4,273,368 | 6/1981 | Tanaka | 292/48 X |
| 4,505,500 | 3/1985 | Utsumi et al. | 292/48 |
| 4,948,184 | 8/1990 | Weyerstall et al. | 292/216 |
| 4,998,049 | 3/1991 | Chapman | 292/341.16 X |
| 5,035,449 | 7/1991 | Shiratori et al. | 292/DIG. 29 X |
| 5,233,849 | 8/1993 | Forbes | 292/DIG. 29 X |
| 5,273,324 | 12/1993 | Kobayshi | 292/201 |
| 5,295,374 | 3/1994 | Bender et al. | 292/DIG. 3 X |

FOREIGN PATENT DOCUMENTS

| | | |
|---|---|---|
| 0 384 719 | 8/1990 | European Pat. Off. . |
| 0 589 158 | 7/1993 | European Pat. Off. . |
| 840519 | 7/1949 | Germany . |
| 39 32 268 | 6/1990 | Germany . |
| 36 26 798 | 6/1991 | Germany . |
| 2 275 962 | 9/1994 | United Kingdom . |

*Primary Examiner*—Rodney M. Lindsey
*Assistant Examiner*—Monica E. Millner
*Attorney, Agent, or Firm*—Sixbey, Friedman, Leedom & Ferguson; David S. Safran

[57] ABSTRACT

A motor vehicle door lock arrangement for a double rear hatch having a lower hatch door which can be swung down and which is attached to lower edge (2) and an upper hatch door which can be folded up and which is attached to upper edge (4) of the body opening. Door lock mechanisms for each hatch door are located on each side edge (6, 7) of the body opening and closure blocks therefor are located on side edges (8, 9) of the hatch doors (3, 5). Each lock mechanism has a rotary latch and detent pawl for securing and releasing a respective closure block. Essentially independent opening of each hatch door is possible. Preferably, the lock mechanisms of lower hatch (13) and upper hatch (5) are combined into a single lock unit on a lock carrier at each side of the body opening.

21 Claims, 4 Drawing Sheets

MOTOR VEHICLE DOOR LOCK ARRANGEMENT FOR A DOUBLE REAR HATCH

BACKGROUND OF THE INVENTION

1. Field of the Invention

The invention relates to a motor vehicle door lock arrangement for a double rear hatch having lower hatch door which can be folded down and which is attached to a lower edge of a vehicle body opening and an upper hatch door which can be folded up and which is attached to an upper edge of the vehicle body opening. In particular, to an arrangement having door locks which are located on each side edge of the body opening or of the lower hatch door with one having a closure block and the other a lock mechanism with a rotary latch and detent pawl. Further, a door lock of the upper hatch door has either a closure block or a lock mechanism with at least one rotary latch and a detent pawl.

2. Description of Related Art

The motor vehicle door lock arrangement for a double rear hatch of published European Patent Application No. 0 384 719 has a closing hinge for each door lock of the lower hatch door on the side edges of the body opening, these door locks being recessed in the side edges of lower hatch door. Nothing is expressed about the structure of the locking mechanisms of the door locks of the lower hatch door, so that it is presumed that each lock has, as usual, a rotary latch and a detent pawl which holds it in the closed position and possibly other levers of a lock mechanism, microswitches, etc. as known for a door lock or rear hatch lock.

The detent pawls of the two door locks located on the lower hatch door for locking the lower hatch door are at the same time actuated or lifted by a handle lever located centrally on the upper edge of the lower hatch door. This handle lever is, however, only functional when a closing cylinder has been actuated and moved beforehand by a key. This closing cylinder which is located on the upper edge in the middle in the lower hatch door actuates the lock mechanism of the door lock of the upper hatch door; from it, only the closing hinge, formed as a transversely positioned closing wedge, is located on the upper hatch door itself.

The lock mechanisms of all three door locks, specifically the two laterally arranged door locks of the lower hatch door and the one centrally located door lock of the upper hatch door are, therefore, centrally actuated from the lower hatch door by the handle lever/closing cylinder. This is easily possible since all three lock mechanisms are located in the lower hatch door. The fact that the handle lever is only unlocked when, beforehand, the closing cylinder has been actuated for purposes of opening the upper hatch door and the upper hatch door has been opened, gives the proper priority of opening of the upper hatch door before the lower hatch door is opened. This is a good idea for safety reasons to prevent opening of the lower hatch door unintentionally with the upper hatch door still closed.

The above described motor vehicle door lock arrangement for a double rear hatch can be actuated by purely mechanical means; there is no mention of a motorized opening aid. But, this does not preclude that this door lock arrangement is provided with motorized, especially electric motorized, central interlock drives which cause unlocking or locking by remote control. This is not further detailed here.

Incidentally, a motor vehicle door lock arrangement for a double rear hatch is also known from German Patent No. 36

26 798 which, coupled in a certain manner, allow a vent window embedded in a rear hatch door of a motor vehicle to be opened separately. Here, however, only a continuous rear hatch door is provided with a window embedded in it so that the construction of the door lock means must satisfy entirely different conditions.

Finally, of course, it is known to provide a motor vehicle door lock arrangement for a double rear hatch door with motorized opening and closing aids (U.S. Pat. No. 4,948,184).

SUMMARY OF THE INVENTION

The primary object of the present invention is to configure and develop a motor vehicle door lock arrangement of the type described initially such that optimum safety values are achieved, independent opening of each hatch door is possible, and at the same time, production costs are low.

The aforementioned object is achieved in a motor vehicle door lock means for a double rear hatch with the features described initially by two door locks being located on the side edges of the upper hatch door.

Initially, according to the invention, the door lock of the upper hatch door is locked in exactly the same manner as the one in the lower hatch door. In this way, locking of the upper hatch door is generally independent of locking of the lower hatch door. The upper hatch door can be interlocked securely against being torn open in the same manner as the lower hatch door, in particular blocking of opening of the upper hatch door is in no way dependent on the seat of the lower hatch door. This has major safety engineering advantages.

One interesting prerequisite for another embodiment of the invention is an inverted arrangement of the door locks with the closure blocks (shackles/clevises) of all four door locks on the hatch doors and the lock mechanisms on the side edges of the body opening. This yields a special advantage in that, specifically, the lock mechanisms for both doors can be combined on each side edge of the body opening in a single closing unit, especially on one lock carrier. Therefore, the complicated assemblies, specifically the lock mechanisms, are joined at one site on the body opening, and only the uncomplicated parts, specifically the closure blocks on the hatch doores, are moved.

The second embodiment has quite special advantages when using a conventional motorized, especially electric motorized, opening drive for the rear hatch locks.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
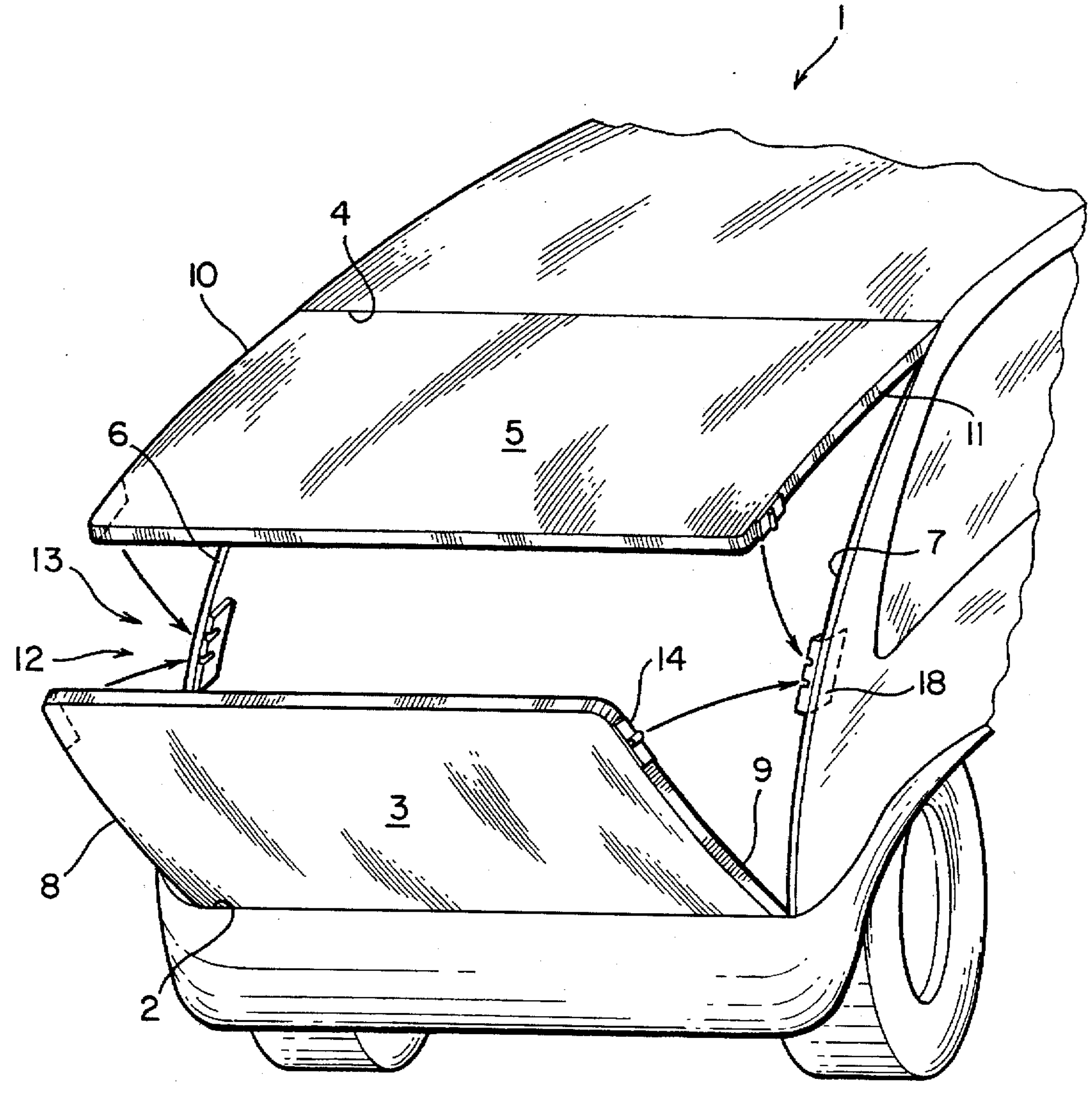
FIG. 1 shows in a perspective view, seen obliquely from the behind, the rear area of a station wagon with a double rear hatch.

From the perspective view of FIG. 1, it can be seen that the rear area 1 of a stretch limousine or a station wagon has a rear body opening with a double rear hatch comprised of a lower hatch door 3 which can be swung down and which is attached to lower edge 2, and an upper hatch door 5 which can be swung up and which is attached to an upper edge 4 of the body opening. The body opening is laterally bounded by side edges 6, 7. Side edges 8, 9 on lower hatch door 3 and side edges 10, 11 on upper hatch door 5 are adjoining side edges 6, 7 in their closed position.

A total of four door locks 12, 13, can be recognized, specifically two door locks 12 which act on the lower hatch door 3, and two door locks 13 which act on the upper hatch door 5.

A glance at FIGS., 2 and 3 shows that each of the door locks 12, has a lock mechanism 15 provided with a rotary latch 16 and a detent pawl 17 which hold and release a closure block 14 which, here, is a closure shackle or clevis, but which also can be executed as a closing pin, closing wedge or closing ratchet.

As FIG. 1 shows, the motor vehicle door lock arrangement according to the invention also has two door locks 13 which are located on side edges 10, 11 of the upper hatch door 5 and sides 6, 7 of the rear opening. This has the advantages explained in the general part of the description.

The FIG. 1 embodiment, furthermore, shows that, according to the preferred teaching, the shackle type closure blocks 14 of all four door locks 12, 13 are located on hatch doors 3, 5 and the lock mechanisms 15 are located on the side edges 6, 7 of the body opening. The advantages of this configuration are manifold. Closure blocks 14 can also be attached to upper hatch door 5 even when the upper hatch door 5 has only a relatively narrow frame with a large window area located therein. Lock mechanisms 15 can be accommodated, admittedly not as well, in any case only with a much wider frame. Actuation of lock mechanisms 15 which lie sideways is difficult in this frame. The weight of hatch doors 3, 5 becomes much less when lock mechanisms 15 are removed from them. Of course, the disadvantage is that lock mechanisms 15 cannot be easily actuated mechanically by one actuation element on one of hatch doors 3, 5 since they do not lie flat on hatch doors 3, 5.

Figure 2:
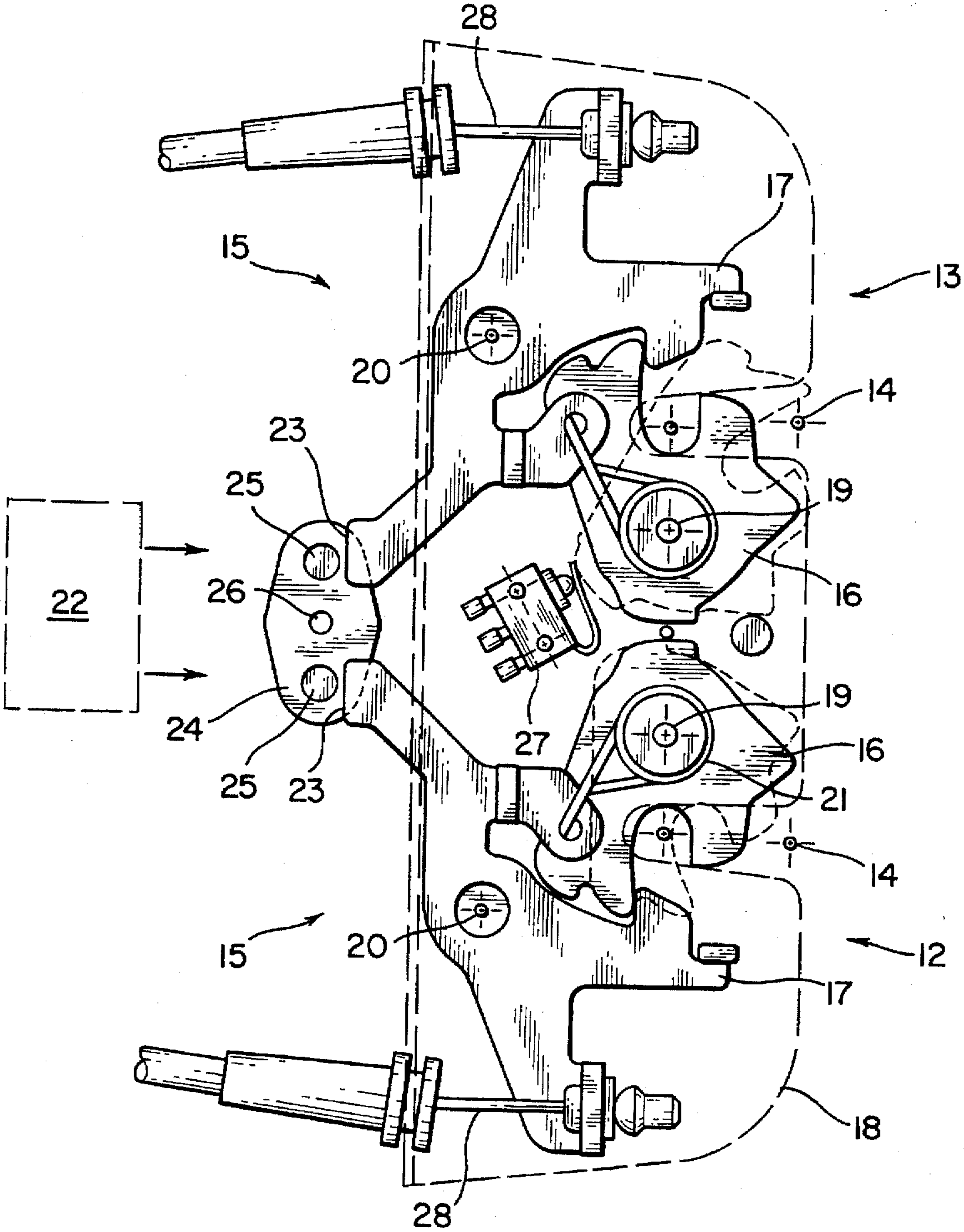
FIG. 2 is a side view of a first embodiment of a motor vehicle door lock arrangement according to the invention.
Figure 3:
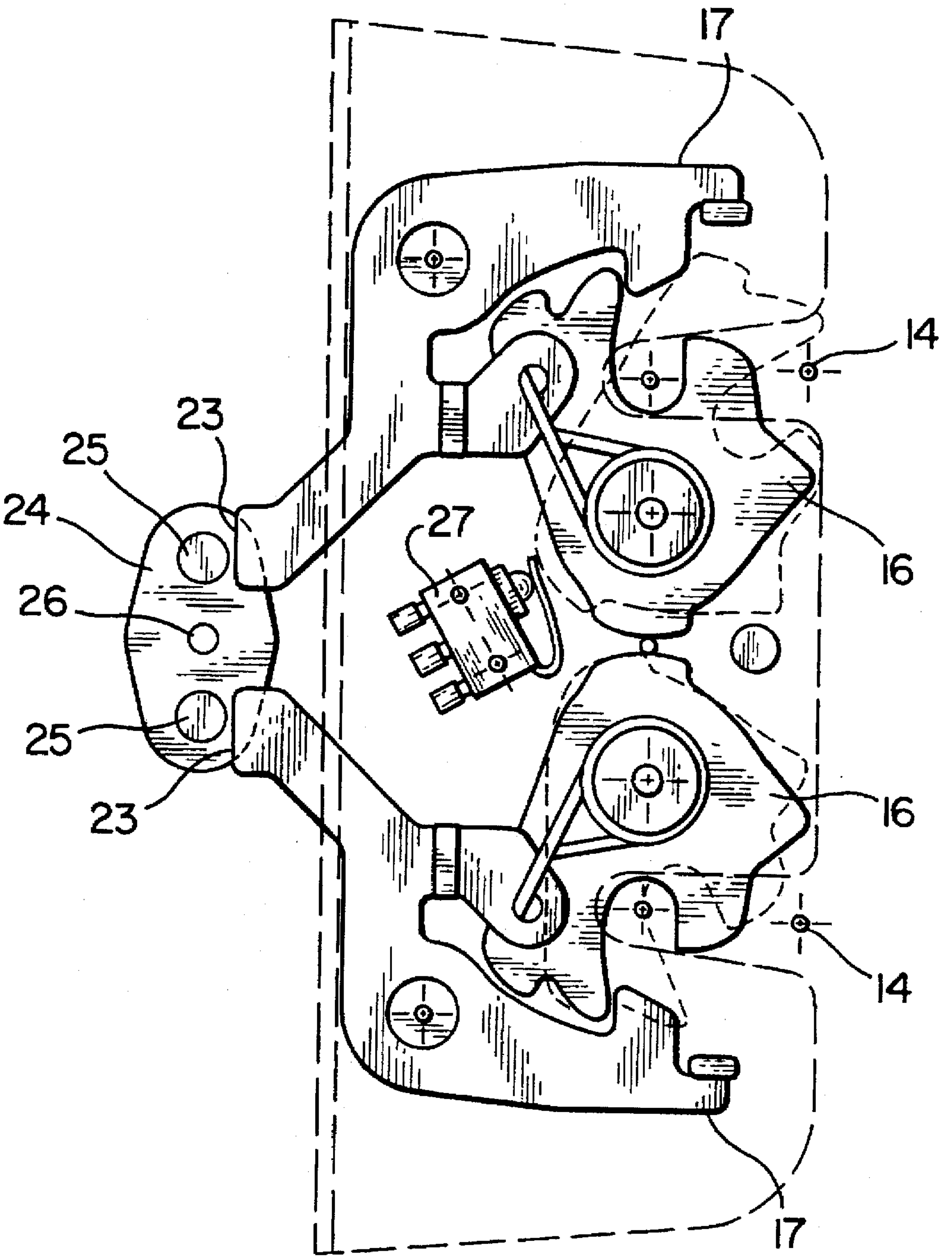
FIG. 3 is a side view of a second embodiment of a motor vehicle door lock arrangement according to the invention.

FIGS. 2 and 3 show embodiments of the door lock mechanism, according to the invention, which are especially cost favorable and feasible in terms of installation. Here, the lock mechanisms of the lower hatch door 13 and of the upper hatch door 5 are each combined in a single lock unit 15 for each side edge 6, 7 of the body opening, especially on a lock carrier 18.

In itself, the described lock mechanisms 15 have a classic structure as is used very often for motor vehicle door locks. For example, in FIG. 2, in upper lock unit 15, both the lock mechanism 13 which is assigned to the upper hatch door 5 and the lock mechanism 12 for the lower hatch door 3 include a rotary latch 16 on an axis 19 and a detent pawl 17 on an axis 20 above/below it. The latch 16 and detent pawl 17 are pretensioned against one another by means of a torsion spring 21 in a conventional manner, i.e., detent pawl 17 in the locking direction (engagement direction), rotary latch 16 in the opening direction (self-driven) swivelling out of rotary latch 16 for pressing on the respective closure block 14. In this embodiment, it applies that axes 19, 20 of rotary latches 16 and detent pawls 17 of door locks 12, 13 run parallel to the pivot axes of the hatch doors 3, 5; this corresponds to the optimum and space-saving arrangement on side edges 6, 7. Otherwise, it further holds that, in the embodiment shown, the rotary latches 16 of door locks 13 of upper hatch door 5 are located mirror-symmetrically to rotary latches 16 of door locks 12 of lower hatch door 3.

As already explained above, the motorized opening drives, themselves, especially electric motorized opening drives, for opening of rear cover or rear hatch locks have been known for decades. These aids have been common especially in the USA for more than 20 years.

In particular, when, as provided in the embodiment shown, lock units 15 are located on side edges 6, 7 of the body opening, but likewise a centralized opening control shall be installed, it is especially recommended that door locks 12, 13 are each provided with a motorized, especially electric motorized, opening drive 22 which drives respective detent pawl 17 to lift it off of the respective rotary latch 16. The opening drive 22 should not be confused with a central interlock drive which is provided for locking and unlocking the remaining door lock 12 or 13 and is also often present, and in any case, can be easily present here as well. Nothing is stated about central interlock drives as they are not part of this invention.

Opening drive 22 causes normal opening of the door lock 12 or 13, and therefore, lifting of the respective detent pawl 17 from the respective rotary latch 16, so that it can press corresponding hatch door 3 or 5 into the opening position under the action of torsion spring 21.

In particular, when lock mechanisms 12, 13 are combined on one side edge 6 or 7 of the body opening in a closing unit 15, especially therefore, on the lock carrier 18, it is recommended that stop surfaces 23 of the detent pawl arm or separated detent pawl lever of door locks 12, 13, opening drive 22 being driven against the stop surfaces, lie next to one another on one side edge 6, 7 and can be separately driven by actuation element 24 which can be driven by opening drive 22 in two directions or in two ways. The embodiment shown in FIG. 2 indicates what is intended.

Here, the detent pawls 17 are elongated on the side of respective axis 20 opposite from latch engaging detent to extend laterally beyond the edge of lock carrier 18 and have abutment surfaces 23 on their ends. Each abutment surface 23 is disposed opposite an actuating pin 25 of actuating element 24. This actuating element 24 represents a double lever which can be turned via a center shaft 26, center shaft 26 being a drive shaft which originates from the opening drive 22. Clockwise rotation of the actuating element 24 around center shaft 26 raises detent pawl 17 of upper lock mechanism 13 of door lock unit 15, while counterclockwise rotation allows actuating pin 25 to swivel away from upper abutment surface 23, and conversely, allows actuating pin 25 in front of lower stop surface 23 to engage it to lift the detent pawl 17 of lock mechanism 12 of the door lock unit 15.

Thus, an extremely simple electric motorized opening of door lock mechanisms 12, 13 is accomplished with an extremely simple form of motion, specifically rotary motion. The two directions of rotation differentiate in the optimum manner between the opening movements for both door lock mechanism 12, 13. This creates the prerequisite for optional control of the opening path of door locks.

The embodiment shown in FIG. 2 also shows a microswitch 27 which senses the position of the rotary latch 16 of upper door lock mechanism 13, and via this microswitch 27, it is determined whether upper hatch door 5 is opened or still closed.

The embodiment shown in FIG. 2 shows, moreover, conventional mechanical emergency opening of detent pawls 17. To do this, detent pawls 17 can be raised by means of mechanical traction elements 28 which are engaged directly. Mechanical traction elements 28 can end by the driver's seat or elsewhere. They can be actuated, for example, by a handle on the inside of the body of the vehicle.

In the embodiment shown in FIG. 3, emergency opening of the door lock means is designed differently, specifically by the fact that detent pawls 17 can be lifted by means of a mechanical element which engages actuating element 24, for example by a crank or pivot lever. Mechanical emergency opening, therefore, acts on the interface between the electric motorized opening drive 22 and detent pawls 17. This can easily be done such that the movement of opening drive 22 or its movement of actuating element 24 is not hindered.

It has already been pointed out in the explanation of the prior art that there is a preferred sequence of opening of hatch doors 3, 5, specifically opening of upper hatch door 5 always before lower hatch door 3. Subsequently, closing of upper hatch door 5 alone without closing of lower hatch door 3 can still be done since it is then clear that this closing motion likewise has taken place intentionally. This sequence of hatch opening acquired from experience has safety engineering advantages.

Figure 4:
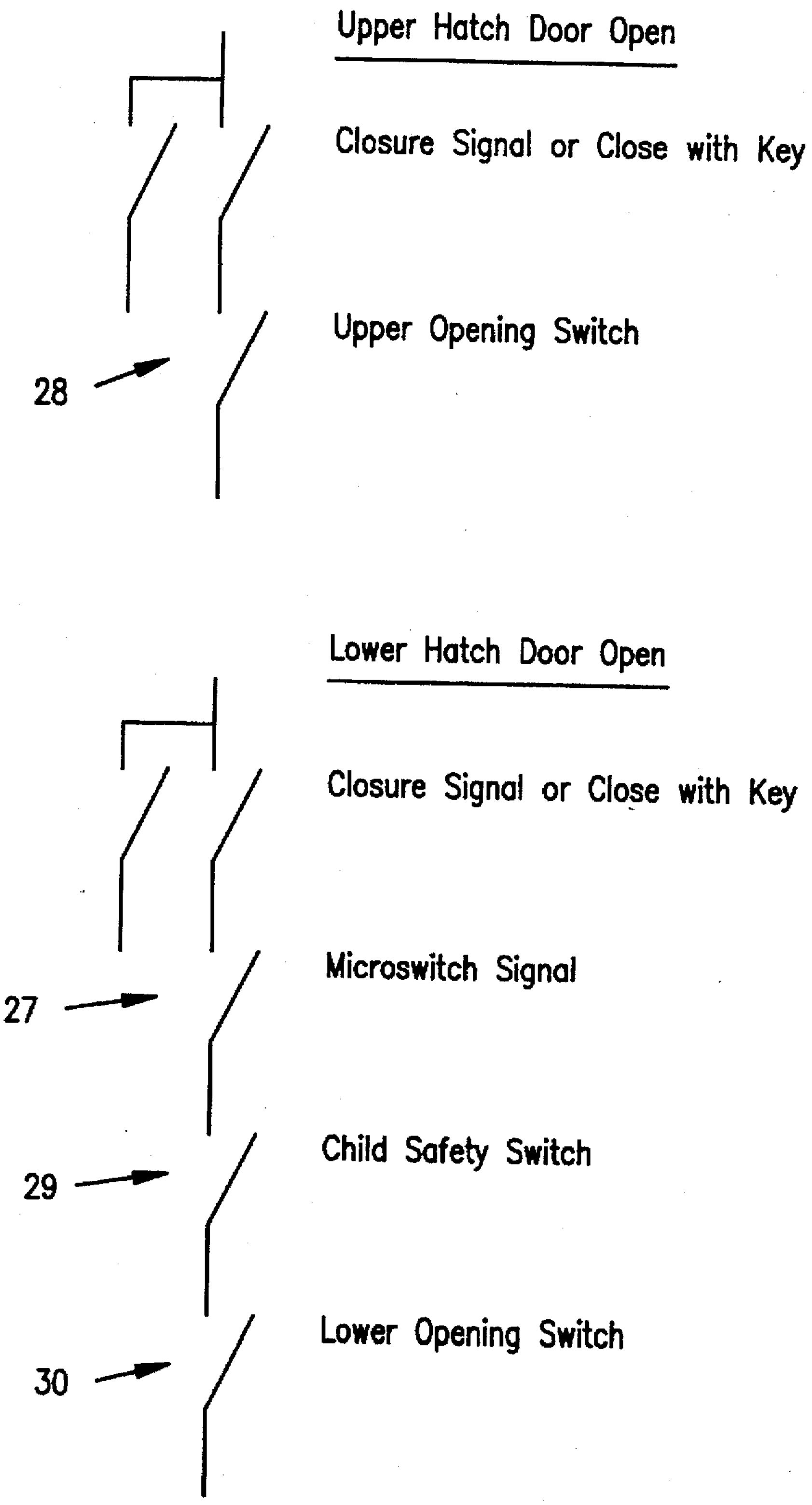
FIG. 4 shows the control circuits of an electric motorized opening drive.

The construction according to the invention offers all possibilities for maintaining a certain sequence. For this reason, according to the invention, it is provided that the motorized opening drive 22 can only be triggered in a certain sequence, especially such that it is ensured that lower hatch door 3 can only open when upper hatch door 5 is already opened. FIG. 4 shows the signal sequence which must be followed to open upper hatch door 5 at the top, while the signal sequence which is necessary to open lower hatch door 3 is shown at the bottom. When opening upper hatch door 5, the opening signal of the central interlock system or mechanical unlocking by means of a key is sufficient. When the opening switch 28 for the upper hatch door 5 is actuated (this switch, in the depicted circuit, is a nonlocking, momentary actuation switch), the lower hatch door 3 can only be opened when, besides the central interlock system signal or the key unlocking signal, the signal of the microswitch 27 which signals opening of upper hatch door 5, the possible child safety signal (switch 29, which is also a nonlocking, momentary actuation switch in the depicted circuit) and the signal of the switch 30 for opening lower hatch door 3 are present at the same time.

Microswitch 27 can, therefore, have functions "determine the position of upper hatch door 5", "release lower hatch door 3" and "turn on inside lights".

The above described concept for a double rear hatch with hatch doors which can be swung around horizontal axes can, in principle, also be used for a double rear door with doors which swing around vertical axes and can be placed under protection.

For an arrangement with vertical axis doors, the terms right and left can replace top and bottom and vice versa in the foregoing description.

While various embodiments in accordance with the present invention 15 have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Arrangement of a motor vehicle door lock on a double rear hatch comprising a pair of hatch doors which are swingable about parallel pivot axes located at first at opposite edges of a rear vehicle body opening, two door locks for each of said pair of hatch doors which are located at each of second opposite edges of the rear vehicle body opening, each door lock having a closure block and a lock mechanism with a rotary latch and a detent pawl for securing and releasing the closure block, wherein the lock mechanisms for the doors are disposed on the second opposite edges, and wherein the closure blocks are provided on facing side edges of the doors; wherein the rotary latches and detent pawls of the door locks are provided with separate rotational axes and said rotational axes are oriented parallel to the pivot axes of the hatch doors.

2. The arrangement according to claim 1, wherein the lock mechanisms of both hatch doors on each second edge of the body opening are combined into a single lock unit on a single lock carrier.

3. The arrangement according to claim 1, wherein the rotary latches of the door locks for one of the hatch doors are located mirror-symmetrically to rotary latches of the door locks of the other of the hatch doors.

4. The arrangement according to claim 2, wherein the rotary latches of the door locks for one of the hatch doors are located mirror-symmetrically to rotary latches of the door locks of the other of the hatch doors.

5. The arrangement according to claim 1, wherein a motorized opening drive is provided for driving the detent pawls in a direction acting to lift each of the detent pawls from a respective rotary latch.

6. The arrangement according to claim 2, wherein a motorized opening drive is provided for driving the detent pawls in a direction acting to lift each of the detent pawls from a respective rotary latch.

7. The arrangement according to claim 5, wherein each of the detent pawls has a detent pawl lever with an abutment surface; wherein an actuation element is provided at each of the second opposite edges which is displaceable in two directions by the opening drive, said actuation element engaging against the abutment surface of the detent pawl lever for one of the hatch doors in a first of said directions and engaging against the abutment surface of the detent pawl lever for the other of the hatch doors in a second of said directions for separately operating the locks for each of said hatch doors.

8. The arrangement according to claim 6, wherein each of the detent pawls has a detent pawl lever with an abutment surface; wherein an actuation element is provided at each of the second opposite edges which is displaceable in two directions by the opening drive, said actuation element engaging against the abutment surface of the detent pawl lever for one of the hatch doors in a first of said directions and engaging against the abutment surface of the detent pawl lever for the other of the hatch doors in a second of said directions for separately operating the locks for each of said hatch doors.

9. The arrangement according to claim 8, wherein the actuation element is a double lever which is rotatable about a center shaft.

10. The arrangement according to claim 1, wherein the detent pawls are provided with emergency opening means for mechanical lifting thereof.

11. The arrangement according to claim 9, wherein said emergency opening means comprises a manually actuatable mechanical traction element directly engaging each detent pawl for enabling remote lifting thereof.

12. The arrangement according to claim 10, wherein said emergency opening means comprises a mechanical element which engages the actuation element for producing lifting of the detent pawls.

13. The arrangement according to claim 5, wherein the motorized opening drive has means for enabling opening of one of the hatch doors only open when the other of the hatch doors is already open.

14. The arrangement according to claim 1, wherein said pair of hatch doors comprise an upper hatch door and a lower hatch door.

15. The arrangement according to claim 2, wherein said pair of hatch doors comprise an upper hatch door and a lower hatch door.

16. The arrangement according to claim 5, wherein said pair of hatch doors comprise an upper hatch door and a lower hatch door.

17. The arrangement according to claim 6, wherein said pair of hatch doors comprise an upper hatch door and a lower hatch door.

18. The arrangement according to claim 7, wherein said pair of hatch doors comprise an upper hatch door and a lower hatch door.

19. The arrangement according to claim 8, wherein said pair of hatch doors comprise an upper hatch door and a lower hatch door.

20. The arrangement according to claim 9, wherein said pair of hatch doors comprise an upper hatch door and a lower hatch door.

21. The arrangement according to claim 13, wherein said pair of hatch doors comprise an upper hatch door and a lower hatch door.

* * * * *